United States Patent
Mohan et al.

(10) Patent No.: US 8,890,418 B2
(45) Date of Patent: Nov. 18, 2014

(54) LIGHTING FIXTURE THAT SELF-ESTIMATES ITS POWER USAGE AND MONITORS ITS HEALTH

(71) Applicants: Tanuj Mohan, Mountain View, CA (US); Zachary Gentry, Oakland, CA (US)

(72) Inventors: Tanuj Mohan, Mountain View, CA (US); Zachary Gentry, Oakland, CA (US)

(73) Assignee: enLighted, Inc., Sunnyvale, CA (US)

(*) Notice: Subject to any disclaimer, the term of this patent is extended or adjusted under 35 U.S.C. 154(b) by 69 days.

(21) Appl. No.: 13/735,007

(22) Filed: Jan. 6, 2013

(65) Prior Publication Data

US 2013/0200807 A1     Aug. 8, 2013

Related U.S. Application Data

(60) Provisional application No. 61/595,032, filed on Feb. 4, 2012.

(51) Int. Cl.
*H05B 37/02* (2006.01)
*H05B 39/04* (2006.01)
*H05B 41/36* (2006.01)
*H05B 37/03* (2006.01)

(52) U.S. Cl.
CPC .............. *H05B 37/02* (2013.01); *H05B 37/034* (2013.01); *Y02B 20/46* (2013.01); *H05B 37/0218* (2013.01)
USPC ........................................... 315/151; 314/64

(58) Field of Classification Search
CPC ... H04B 41/325; H04B 41/3922; G03B 15/05
USPC .............................. 315/151; 325/205; 314/64
See application file for complete search history.

(56) References Cited

U.S. PATENT DOCUMENTS

| | | | |
|---|---|---|---|
| 5,101,141 | A | 3/1992 | Warner et al. |
| 5,179,324 | A | 1/1993 | Audbert |
| 5,191,265 | A | 3/1993 | D'Aleo et al. |
| 5,283,516 | A | 2/1994 | Lohoff |
| 5,812,422 | A | 9/1998 | Lyons |
| 6,057,654 | A | 5/2000 | Cousy et al. |
| 6,188,181 | B1 | 2/2001 | Sinha et al. |
| 6,342,994 | B1 | 1/2002 | Cousy et al. |
| 6,548,967 | B1 | 4/2003 | Dowling et al. |
| 7,309,985 | B2 | 12/2007 | Eggers et al. |
| 7,348,736 | B2 | 3/2008 | Piepgras et al. |
| 7,382,271 | B2 | 6/2008 | McFarland |
| 7,437,596 | B2 | 10/2008 | McFarland |
| 7,550,931 | B2 | 6/2009 | Lys et al. |
| 7,566,137 | B2 | 7/2009 | Veskovic |
| 7,623,042 | B2 | 11/2009 | Huizenga |
| 7,792,956 | B2 | 9/2010 | Choong et al. |
| 7,924,174 | B1 * | 4/2011 | Gananathan ................ 340/999 |
| 7,925,384 | B2 | 4/2011 | Huizenga et al. |
| 8,508,149 | B2 * | 8/2013 | Mohan et al. ................ 315/291 |
| 2004/0002792 | A1 | 1/2004 | Hoffknecht |
| 2005/0169643 | A1 | 8/2005 | Franklin et al. |
| 2006/0275040 | A1 | 12/2006 | Franklin |
| 2007/0057807 | A1 | 3/2007 | Walters et al. |

(Continued)

*Primary Examiner* — Dylan White
(74) *Attorney, Agent, or Firm* — Brian R. Short

(57) ABSTRACT

Apparatuses, methods and systems for lighting fixture determining its power usage and monitoring its operational health are disclosed. One embodiment includes a method of a lighting fixture determining its power usage. The method includes sensing, by an ambient light sensor, an intensity of light emitted from the lighting fixture, and estimating power usage of the lighting fixture based on the sensed intensity of light.

21 Claims, 10 Drawing Sheets

(56) References Cited

U.S. PATENT DOCUMENTS

| | | |
|---|---|---|
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2008/0185977 A1 | 8/2008 | Veskovic et al. |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0264846 A1 | 10/2010 | Chemel et al. |
| 2010/0270933 A1 | 10/2010 | Chemel et al. |
| 2010/0295482 A1 | 11/2010 | Chemel et al. |
| 2010/0301777 A1 | 12/2010 | Kraemer |
| 2011/0031897 A1* | 2/2011 | Henig et al. .................. 315/297 |
| 2012/0098439 A1* | 4/2012 | Recker et al. ................. 315/152 |
| 2012/0299485 A1* | 11/2012 | Mohan et al. ................. 315/153 |
| 2013/0063032 A1* | 3/2013 | Nevins et al. ................. 315/115 |
| 2013/0187552 A1* | 7/2013 | Frodsham et al. ............ 315/152 |
| 2013/0320862 A1* | 12/2013 | Campbell et al. ............. 315/152 |
| 2014/0072211 A1* | 3/2014 | Kovesi et al. ................. 382/164 |

\* cited by examiner

LIGHTING FIXTURE THAT SELF-ESTIMATES ITS POWER USAGE AND MONITORS ITS HEALTH

RELATED APPLICATIONS

This patent application claims priority to U.S. provisional patent application Ser. No. 61/595,032, filed on Feb. 4, 2012, which is herein incorporated by reference.

FIELD OF THE EMBODIMENTS

The described embodiments relate generally to lighting. More particularly, the described embodiments relate to apparatuses, methods and systems of a lighting fixture self-estimating its power usage and monitoring its health.

BACKGROUND

Some existing lighting system fixtures include power meters for self-monitoring the power being consumed by the lighting system fixtures. Power meters are expensive, and only provide the measured power consumed by the light fixture, and do not provide representations of the intensity of light emitted from the light fixture. A defective or aging light source might provide lower light output at the some power consumption levels. Power meters typically have to be installed in high voltage (110-277 VAC) circuits and require qualified personnel to install. With the advent of LEDs low-voltage DC is available at the fixture that can be leveraged for adding power and health monitoring intelligence at the fixture.

It is desirable to have methods, systems and apparatuses for lighting fixtures, wherein the lighting fixtures self-monitors or self-measures their power usage. Additionally, it is desirable that the lighting fixtures monitor their operational health.

SUMMARY

One embodiment includes a lighting fixture. The lighting fixture includes a light, and a light intensity controller connected to the light for controlling an intensity of light emitted from the light. The lighting fixture further includes an ambient light sensor for sensing the intensity of light emitted from the light, and a controller, wherein the controller is configured to estimate a power usage of the lighting fixture based on the sensed intensity of light.

Another embodiment includes a method of a lighting fixture determining its power usage. The method includes sensing, by an ambient light sensor, an intensity of light emitted from the lighting fixture, and estimating power usage of the lighting fixture based on the sensed intensity of light.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in an apparatuses, systems and methods for a lighting fixture determining its own power usage and monitoring its health. The lighting fixture includes an ambient light sensor that receives and monitors an intensity of light being emitted from the light fixture. Based on the received light, the lighting fixture can self-estimate the power usage of the light fixture. Additionally, by controlling a dimming control to the light fixture, and monitoring the intensity of light being emitted from the light, the lighting fixture can self-monitor the operational health of the lighting fixture.

Figure 1:
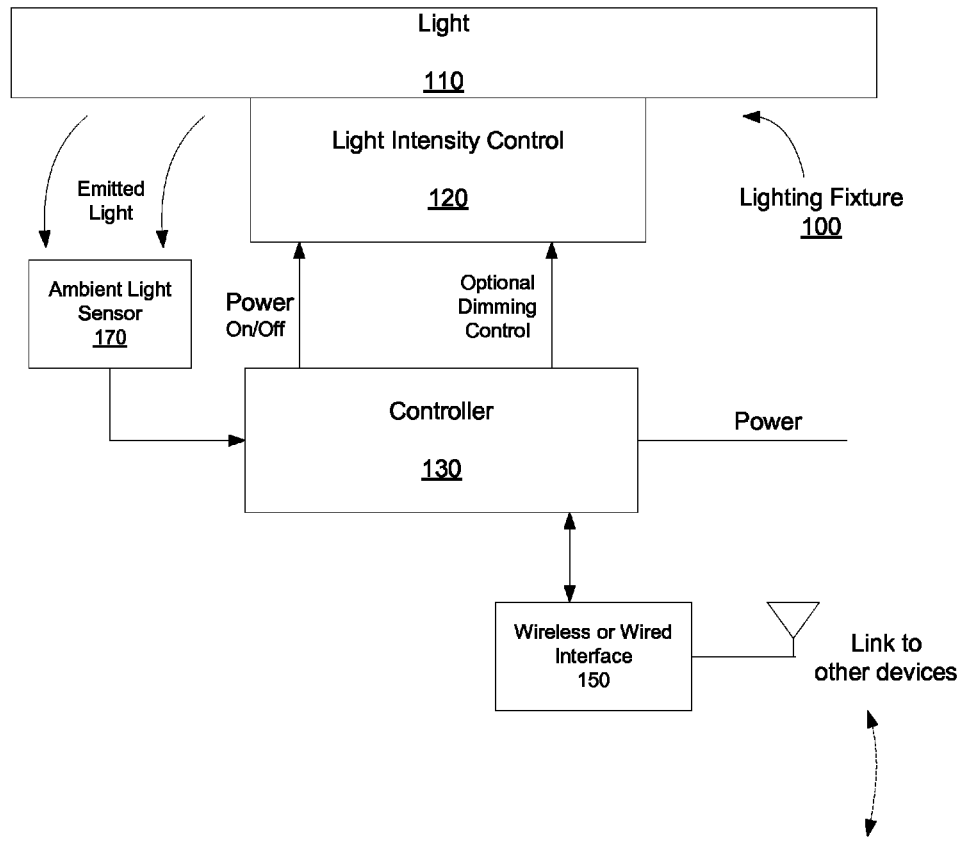
FIG. 1 shows an intelligent light fixture that self-estimates its power usage, according to an embodiment.

FIG. 1 shows an intelligent light fixture 100 that self-estimates its power usage, according to an embodiment. The light fixture 100 includes a light 110, a light intensity controller 120, a controller 130 and an ambient light sensor 170. The light intensity controller 120 connected to the light 110 for controlling an intensity of light emitted from the light 110. The ambient light sensor 170 sensing the intensity of light emitted from the light 110. The controller 130 (or an external controller which is interfaced with the controller 130) is operative to estimate a power usage of the lighting fixture 100 based on the sensed intensity of light.

For an embodiment, the light 110 includes a light emitting diode (LED). For another embodiment, the light 110 includes a fluorescent light. However, the embodiments described are applicable to any type of light.

For an embodiment, the controller 130 controls the light 110 by providing or not providing power (the power control being on or off) to the light intensity control 120. This configuration may or may not have a range of dimming control over the Light 110. That is, the dimming control is optional.

As configured, the light fixture 100 is able to monitor (estimate) its power usage. Additionally, for some embodiments, the light fixture 100 is capable of estimating the remaining life of the light 110. For other embodiments, an external controller (such as a managing controller) is operative to monitor and estimate the power usage and remaining life of the light 110.

Additionally, by controlling the dimming input applied to the light 100 and monitoring the intensity of light emitted from the light 100 with the ambient light sensor 170, the lighting fixture can self-monitor its operational health. The light 100 can be controlled by a variety of ways, for example, input voltage control, a 0-10V DC dimming control signal, DALI (Digital Addressable Lighting Interface) commands etc. As will be described, one embodiment includes passive monitoring, and another embodiment includes active monitoring. For passive monitoring, the normal operation of a light fixture is not influenced by the monitoring. That is, the dimming control applied to the light 100 occurs based on normal system operation procedures, such as, reacting to motion or requests for light. Once the light is activated, the response of the light is monitored.

For an embodiment of passively monitoring, reporting windows are periodically spaced in time, wherein during the reporting window, the applied dimming control and the response of the light 100 to the applied dimming control are monitored. That is, for example, reporting windows may occur at 1 hour periods of time, and last for a time period of 5 minutes. Clearly, different reporting window periods and duration are possible. The behavior of the light 100 is monitored during the reporting windows, and anomalies reported.

Anomalies can include, for example, the sensed intensity of the light not adjusting to the dimming control applied to the light in a manner consistent with a properly operating light. For example, the applied dimming control may change by X%. Accordingly, the sensed intensity of light should change within a margin of X%. If not, an anomaly if the light fixture can be identified, suggesting the light fixture is not operating properly.

The expected change in the sensed light intensity for a given change of the applied dimming control can be aided by running an initialization test that includes varying the dimming control over a range, and monitoring the resulting sensed light intensity. The initialization test can be run, for example, during deployment of the light fixture, wherein proper operation of the light fixture can be confirmed, for example, by an installer. The initialization test can therefore be referenced during future monitoring of the operation of the light fixture. That is, additional testing that includes varying the dimming control over a range, and monitoring the resulting sensed light intensity can be performed during the life of the operation of the light fixture. For an embodiment, at least one of the controller or the external controller is further operative to determine a baseline representation of an on and off state of the light and resulting sensed intensity of light at installation, and compare the baseline representation with later obtained representations of on and off states of the light and resulting sensed intensity of light. For an embodiment, at least one of the controller or the external controller is operative to determine a baseline representation of the dimming control applied to the light and resulting sensed intensity of light at installation, and compare the baseline representation with later obtained representations of the dimming control applied to the light and resulting sensed intensity of light. For an embodiment, if a gradual degradation of sensed intensity of light is observed (for either the on and off state of the light condition, or the dimming control applied to the light condition), at least one of the controller or the external controller deduces that the light is aging, and if a sudden degradation of sense light intensity of the light is observed, then at least one of the controller or the external controller deduces that at least one sub-light of a plurality of sub-lights of the light is non-operational.

For an embodiment, if an anomaly of the light fixture is identified, the identification can be confirmed or supplemented by polling neighboring light fixtures. For an embodiment, neighboring light fixtures are lighting fixtures of a common motion logical group. For an embodiment, lights of a common motion logical group are lights that sense motion in a consistent manner. For example, light fixtures co-located within a conference room can be included within a common motion logical group. Motion sensed by one light within the common motion logical group can be used by other light fixtures within the common motion logical group to activate or increase their emitted light. Another example of a common motion logical group includes light fixtures of a corridor. Again, motion sensed by one light fixture can be used to activate the lighting of other light fixtures of the common motion logical group.

Neighboring light fixtures typically are exposed or subject to nearly the same conditions. That is, surrounding light and motion tend to be about the same. Therefore, if a light fixture is identified as potentially having a failure due to the identification of an anomaly of the sensed emitted light of the light fixture, this anomaly can be further confirmed or supplemented by polling neighboring light fixtures to determine if they have or have not identified an anomaly as well.

For an embodiment, if an anomaly of the light fixture is identified, the identification can be confirmed or supplemented by performing an active monitoring test. Unlike the passive monitoring test, the active test includes proactively adjusting the applied dimming control and then sensing the emitted light intensity. The active test is generally more reliable because of the absolute control the active test provides. Utilizing the passive test first can be advantageous because the passive test is less intrusive on the occupants within a structure in which the light fixture is located. That is, an active test proactively adjusts the lighting which may intrude upon the activities of the occupants. Therefore, this embodiment only utilizes the active test upon determining a potential failure of the light fixture based on a passive test. For an embodiment, the active test is only utilized when a motion sensor of the light fixture indicates there are no occupants proximate to the light, and/or a timer determines that the timing of the active test is at a time in which occupants are unlikely to be present.

The results of the power usage and health monitoring of the light fixture 100 can be communicated to a lighting system manager, or to neighboring light fixtures through an interface 150.

Figure 2:
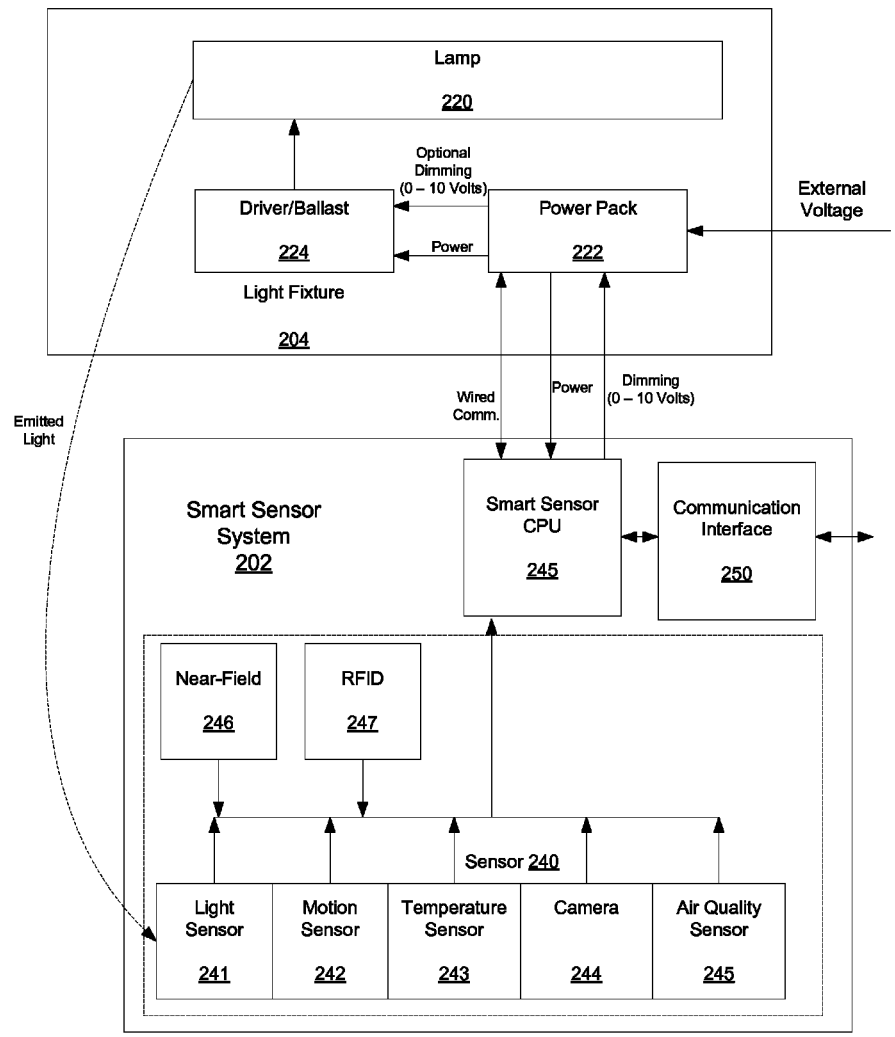
FIG. 2 shows an intelligent light fixture that self-estimates its power usage, according to another embodiment.

FIG. 2 shows an intelligent light fixture that self-estimates its power usage, according to another embodiment. Here, the intelligent light fixture includes a light fixture 204 and a smart sensor system 202. For this embodiment, the light fixture 204 includes a lamp 220, a driver 224 and a power pack 222.

The power pack 222 receives an external voltage which provides power to the light fixture 204 and the smart sensor system 202. Additionally, the power pack 222 receives dimming control from the smart sensor system 202. Based on control information from the smart sensor system 202, the power pack 222 provides dimming control (again, the dimming control is optional) and power to the driver 224. The driver 224 can include an LED driver, or a florescent light ballast.

The driver 224 controls the applied voltage or current to the lamp (light) 220 which controls an intensity of light emitted from the lamp 220. As described, the lamp can include any type of light, such as, LED, incandescent, HID, or florescent.

The emitted light is received by a light sensor 241 of the smart sensor system 202. For an embodiment, a smart sensor CPU 245 of the smart sensor system 202 monitors the received light intensity. Additionally, for at least some embodiments, the smart CPU 245 controls the dimming of the lamp 220. By being able to control the lamp 220 and monitor the emitting intensity of light from the lamp 220, the smart sensor system 202 is able to monitor the power usage of the lamp 220, and monitor the health of the light fixture 204.

As shown, the smart sensor system 202 includes a sensor 240 that includes, for example, the light sensor 241 (for example, an ambient light sensor), a motion sensor 242, a temperature sensor 243, a camera 244, an air quality sensor 245, a near-field sensor 246, and/or an RFID sensor 247. The sensor 240 provides the sensed information to the smart sensor CPU 245.

The smart sensor CPU 245 provides self-estimation of power usage of the intelligent light fixture and monitors the health of the intelligent light fixture based on controlling the lamp 220 and monitoring the sensed information of the sensor 240. For an embodiment, the smart sensor CPU 245 communicates the power usage information and the monitored health information to external devices through, for example, the communication interface 250.

Figure 3:
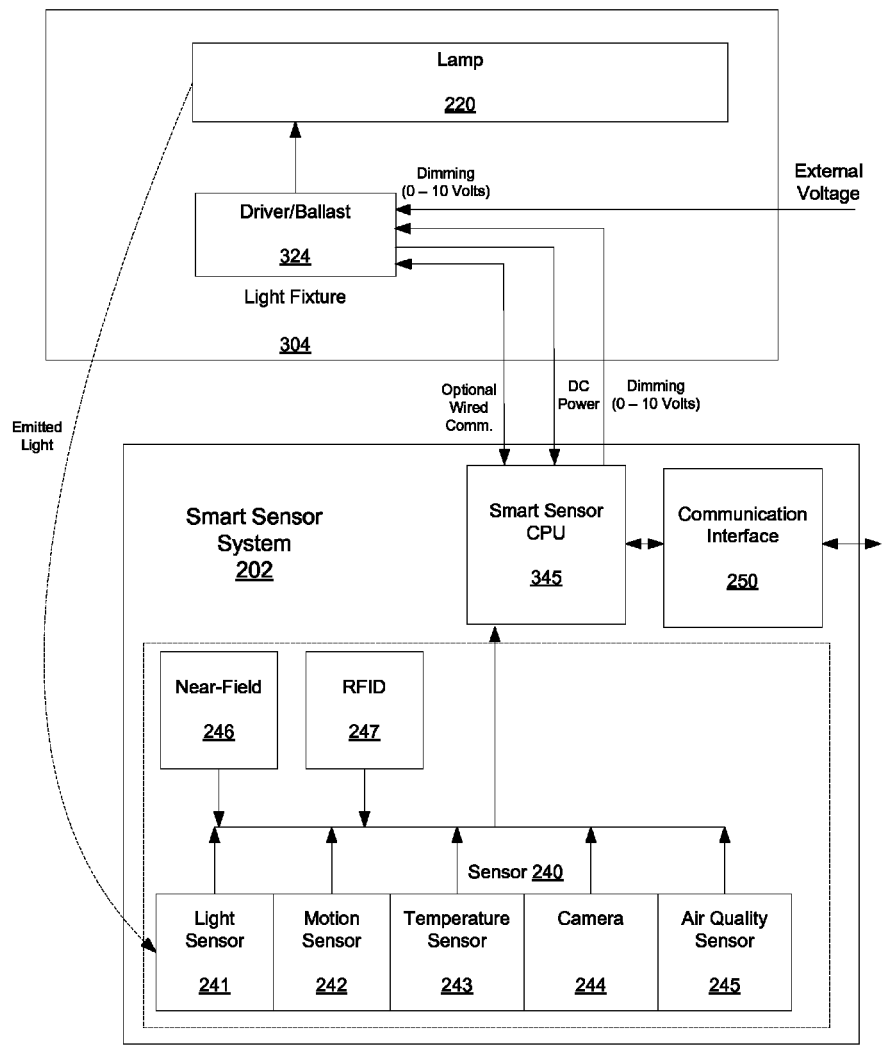
FIG. 3 shows an intelligent light fixture that self-estimates its power usage, according to another embodiment.

FIG. 3 shows an intelligent light fixture 304 that self-estimates its power usage, according to another embodiment. The driver 324 of most LEDs includes an AC (alternating current) to DC (direct current) converter. Therefore, if the lamp 222 includes one or more LEDs, the power pack 222 may be eliminated, and the DC voltage provided by the driver 324. The external voltage is connected directly to the driver 324.

For this embodiment, the smart sensor CPU 345 directly controls the dimming voltage to the driver 324. A DC voltage is provided to the smart sensor CPU 345 by the driver 324. In another embodiment the 0-10V DC input control provides enough power to power up the CPU 345. In another embodiment the CPU 345 is battery powered. An optional wired communication link between the driver 324 and the CPU 345 is shown.

As previously described, the light sensor 241 of the sensor 240 of the smart sensor system 202 senses the intensity of light emitted from the light fixture 304. Thereby, the described embodiments for the lighting fixture (wherein the term lighting fixture includes the light fixture 304 and the smart sensor system 202) determining its own power usage and monitoring its health are at least partially performed by the smart sensor CPU 345. It is possible for at least some of the processing to be managed by a controller that is connected (such as, through the communication interface 250) to the smart sensor CPU 345.

Figure 4:
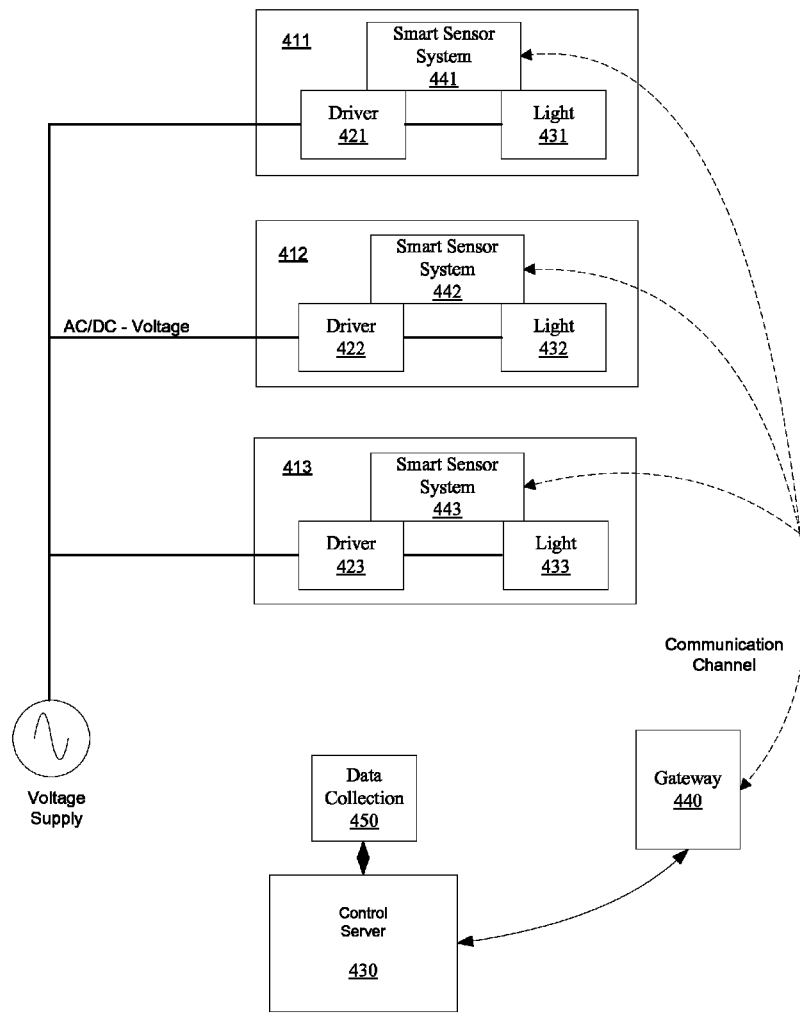
FIG. 4 shows a plurality of intelligent light fixtures that self-estimate their power usage and report statuses to a managing controller, according to an embodiment.

FIG. 4 shows a plurality of intelligent light fixtures 411, 412, 413 that self-estimate their power usage and report statuses to a managing controller 430, according to an embodiment. Similar to the previously described embodiments, each of the intelligent light fixtures 411, 412, 413 include a driver 421, 422, 423, a smart sensor system 441, 442, 443, and a light 431, 432, 433. For an embodiment, a controller within the light fixtures 411, 412, 413 and/or the managing controller 430 influences the dimming control applied to each of the lights 431, 432, 433. For an embodiment, ambient light sensors within each of the smart sensor systems 441, 442, 443 sense intensity of light emitted from each of the lights 431, 432, 433. Each of the light fixtures 411, 412, 413 can independently monitor their power usage and monitor their operational health. Additionally, or alternatively the managing controller 430 can monitor their power usage and monitor their operational health.

For an embodiment, each of the light fixtures 411, 412, 413 report their applied dimming control and sensed light intensity as monitored over time. Based on this knowledge of the applied dimming control, and the sensed light intensity, the managing controller 430 can identify faulty or improperly operating lights (or light fixtures). That is, if the sensed light intensity of a light is not consistent to what would be expected based on the dimming control applied to the light, the managing controller 430 can deduce that the light is not properly operating.

Because the managing controller 430 can communicate with multiple light fixtures, 411, 412, 413, the managing controller 430 can use information obtained from neighboring light fixtures to confirm or verify the operation of a suspected faulty light fixture. Additionally, the managing controller 430 can actively control the environment around the suspect faulty light fixture. For example, if a light fixture is suspected to be faulty based on its reported operation, the managing controller 430 can dim or turn off the neighboring light fixtures, thereby controlling the light around the suspect light fixture. The managing controller 430 can then actively control operation of the suspect light fixture, and confirm (by, for example, adjusting the applied dimming control to the light of the suspect light fixture, and monitoring the intensity of the resulting light emitted from the light of the suspect light fixture) that the suspect light fixture is faulty in a well-controlled environment.

The managing controller 430 can communicate wirelessly to each of the light fixtures 411, 412, 413. For an embodiment, the communication includes one or more gateways (such as, gateway 440). For an embodiment, the managing controller 430 includes a data collection database which includes, for example, baseline performance (applied dimming control versus sensed light intensity) of each of the light fixtures 411, 412, 413. The baseline performance of each light fixtures 411, 412, 413 can be determined at the time of commissioning of the light fixtures 411, 412, 413, and can be additionally supplemented by later performed characterizations.

Figure 5:
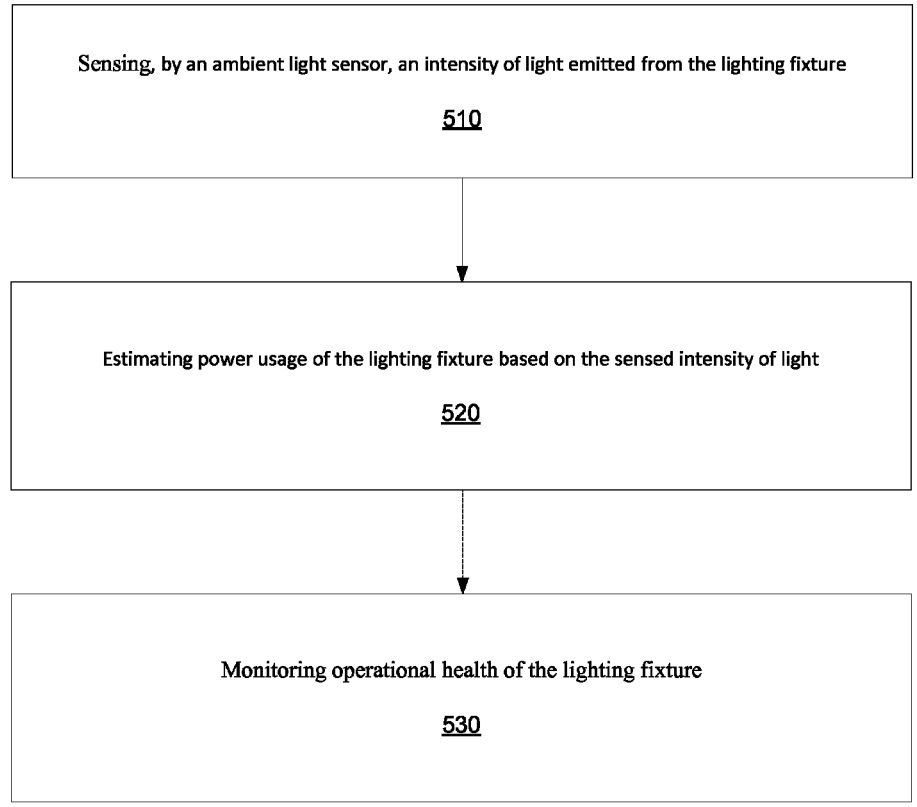
FIG. 5 is a flow chart that includes steps of an example of a method of a lighting fixture determining its power usage

FIG. 5 is a flow chart that includes steps of an example of a method of a lighting fixture determining its power usage. A first step 510 includes sensing, by an ambient light sensor, an intensity of light emitted from the lighting fixture. A second step 520 includes estimating power usage of the lighting fixture based on the sensed intensity of light. As described, embodiments of the light fixture include a light and the ambient lighting sensor.

An embodiment further includes a third step 530 that includes monitoring operational health of the lighting fixture. For an embodiment, the monitoring is performed passively. That is, for this embodiment, a dimming control applied to the light and a sensed intensity of light emitted from the light is passively monitored. For another embodiment, the monitoring is performed actively (active monitoring). For another embodiment, the monitoring is performed passively, and if an anomaly is discovered, active monitoring is engaged to verify the identified anomaly.

For an embodiment, the lighting fixture and a plurality of other light fixtures report their monitored behavior (for example, applied voltage and corresponding sensed intensity of light) to a managing controller. For an embodiment, the managing controller actively tests the lighting fixture if the managing controller determines that the light fixture may be problematic. For an embodiment, the managing controller turns off or on at least some of the other light fixtures that are determined to be neighbors of the light fixture, actively adjusts a dimming voltage applied to the light, and monitors the intensity of light emitted from the light that results, thereby allowing the managing controller to determine whether the lighting fixture is operating properly.

As previously described, the passive monitoring includes the applied dimming control occurring during normal operation of the light fixture due, for example, to sensed motion or a request for a change in intensity of emitted light. Active monitoring includes proactively changing the applied voltage and then monitoring the sensed intensity of light emitted from the light fixture.

The expected change in the sensed light intensity for a given change of the applied dimming control can be aiding by running an initialization test that includes varying the applied dimming control over a range, and monitoring the resulting sensed light intensity. The initialization test can be run, for example, during deployment of the light fixture, wherein proper operation of the light fixture can be confirmed, for example, by an installer. The initialization test can therefore be referenced during future monitoring of the operation of the light fixture.

An embodiment further includes the controller being further operative to poll neighboring light fixtures to aid in determination of a condition of the light fixture if the light fixture fails a passive monitoring test. For an embodiment, the neighboring light fixtures are light fixtures within a common motion logical group as the light fixture. For an embodiment, a motion logical group is a group of light fixtures that are designated, or auto-designate themselves to be included within a common logical group (that is, the motion logical group). It is to be understood that there are various embodiments for implementing this motion group. The members of the group can be defined as desired to ensure user-friendly behavior of lighting produced by the member of the motion sensing group.

For an embodiment, monitoring the light fixture includes adjusting a dimming control applied (for passive or active monitoring) to the light by greater than a threshold, and monitoring the sensed intensity of light emitted from the light for a predetermined period of time. If the emitted light does not correlate with the applied change, it can be determined that the lighting fixture is not operating properly. That is, if the sensed emitted light does not change within a threshold percentage of a change of the applied dimming control, then the emitted light is determined to be uncorrelated with the applied diming control.

For an embodiment, the passive monitoring occurs during reporting windows. For an embodiment, the reporting windows occur periodically, and for a reporting window duration of time. The period of the reporting window can be, for example, once an hour, and the reporting window duration of time can be, for example, five minutes.

For an embodiment, the power usage of the light fixture is estimated by referencing a known relationship between the power usage and the emitted light of a light of the lighting fixture, and the sensed emitted light. Other embodiments further include confirming the estimated power usage by referencing a known relationship between the power usage and a dimming control voltage applied to a light of the lighting fixture. For particular embodiments, confirming power usage is determined based on the known relationship between the power usage and the dimming control voltage applied to the light of the lighting fixture, and an actual dimming control voltage applied to the light.

At least some embodiments further include generating a reference lighting intensity by at least one of turning the light of the lighting fixture off or on, and the ambient light sensor sensing the change.

At least some embodiments further include determining a baseline representation of dimming control applied to the light and resulting sensed intensity of light at installation, and comparing the baseline representation with later obtained representations of dimming control applied to the light and resulting sensed intensity of light. For an embodiment, if a gradual degradation of sensed intensity of light is observed, it is deduced that the light is aging, and if a sudden degradation of sense light intensity of the light is observed, then it is deduced that at least one sub-light of a plurality of sub-lights of the light is non-operational.

At least some embodiments include predicting an end of life of a light of the lighting fixture by referencing a known relationship of emitted light intensity of the light over time. For some embodiments the end of life of the light is estimated based on the known relationship of emitted light intensity of the light over time, and the sensed emitted light. For example, if the light output has fallen to 70% of its original intensity the light source has typically reached the end of its effective life.

Figure 6:
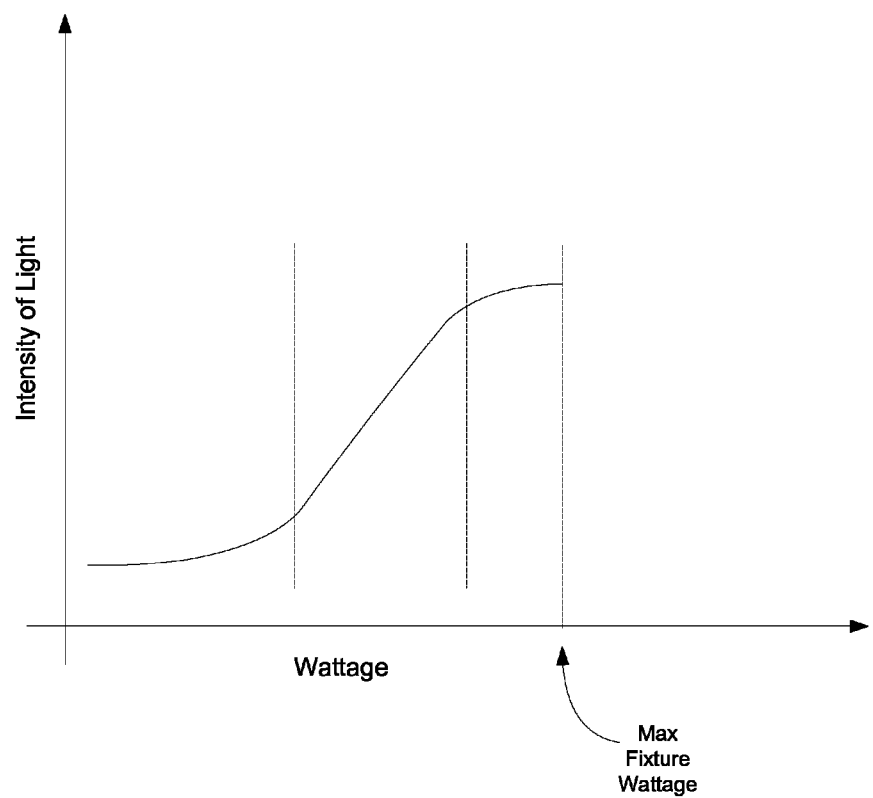
FIG. 6 is a plot that shows an example of how the emitted intensity of light varies with power consumed by the light.

FIG. 6 is a plot that shows an example of how the emitted intensity of light varies with power consumed by the light. Based on the known relationship between the intensity of emitted light and the power being consumed by the light, the power being consumed can be estimated base on a sensed value of the intensity of light being emitted. The relationship can be predetermined, and access after the intensity of light has been sensed. A maximum wattage of the lighting fixture is indicated.

Figure 7:
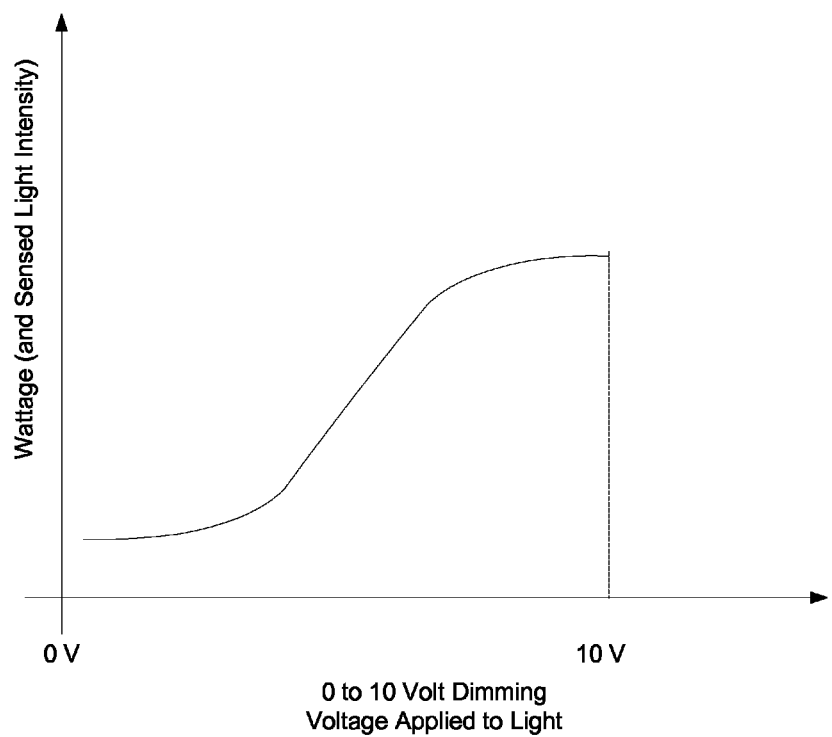
FIG. 7 is a plot that shows an example of how the wattage of power dissipated by a light varies with a dimming control with, for example, a 0-10V DC voltage applied to the light.

FIG. 7 is a plot that shows an example of how the wattage of power dissipated by a light varies with dimming control voltage applied to the light. For some embodiments, the controller 130 applies a 0-10V DC dimming voltage to the light intensity control 120, wherein a value of the applied dimming control voltage determined the intensity of light emitted from the light 110. FIG. 7 provides a relationship between the applied dimming control voltage to the light and the corresponding wattage (power consumed) by the light. It is to be understood the alternate light dimming techniques can alternatively or additionally be used.

Figure 8:
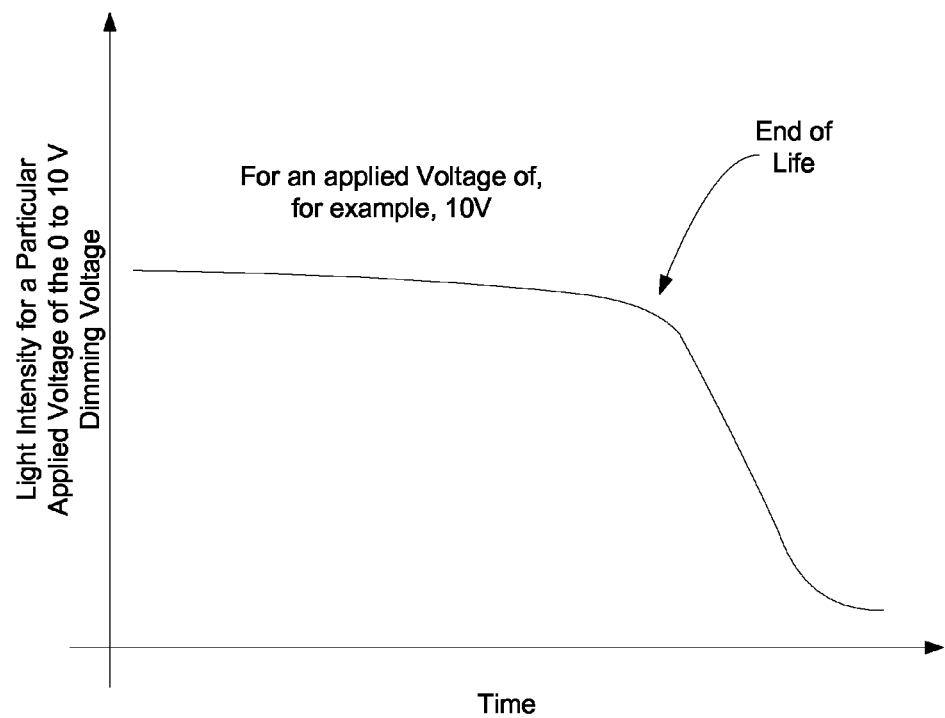
FIG. 8 is a plot that shows an example of how the emitted intensity of light with a constant dimming 0-10V DC input varies over time.

FIG. 8 is a plot that shows an example of how the emitted intensity of light with a constant dimming control applied voltage varies over time. For example, a constant dimming control voltage of 10 Volts may be applied. As the light 110 ages, the relationship between the voltage applied to the light and the intensity of light emitted from the light changes. Generally, the relationship remains fairly constant until the light enters an "end of life" stage, wherein the level of emitted light for an applied voltage falls off quickly. By the controller 130 monitoring the sensed level of intensity of light for a particular dimming control voltage applied to the light, the controller 130 can observe when the light 110 is entering "end of life" condition. Based on this knowledge, the controller 130 can estimate when the light 110 is going to need replacement. It is to be understood the alternate light dimming techniques can alternatively or additionally be used.

Figure 9:
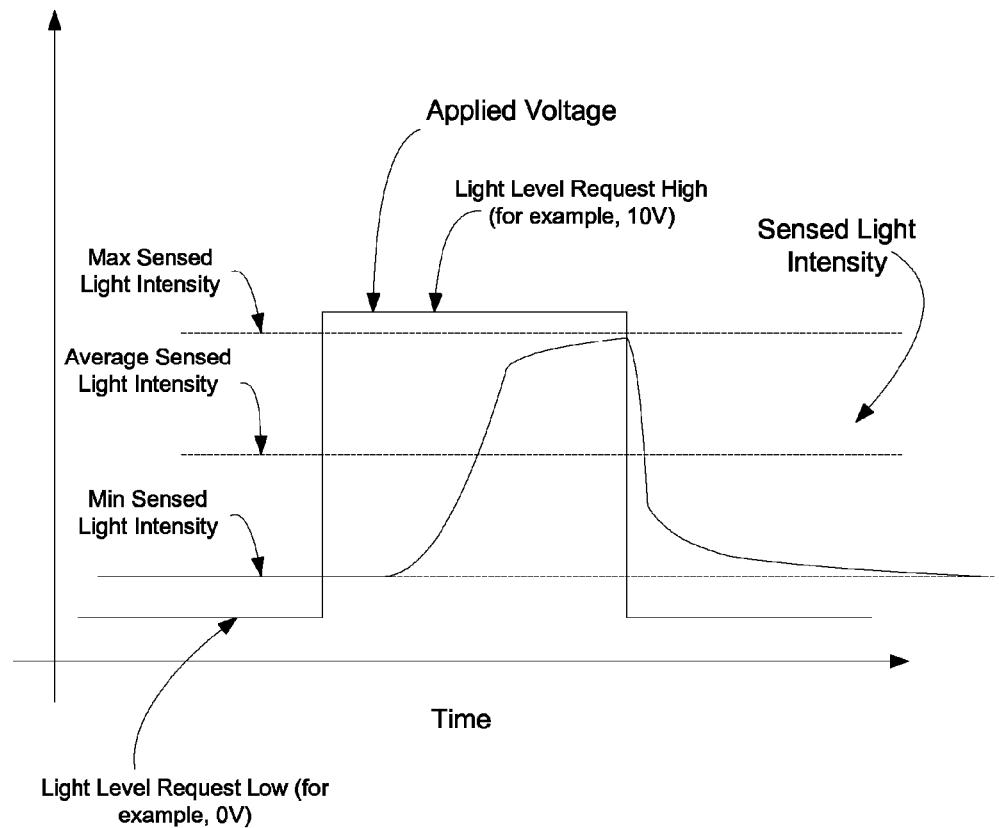
FIG. 9 is a plot showing a 0-10V DC input voltage applied to a light and examples of a corresponding change in intensity of light emitted from the light, according to an embodiment.

FIG. 9 is a plot showing a dimming control applied to a light and examples of a corresponding change in intensity of light emitted from the light. As shown, a dimming control applied (Applied Control) to the light determined the intensity of light emitted from the light. If operating properly, the emitted light (Sensed Light Intensity) will approximately follow the applied control. As shown in FIG. 9, the applied control goes from a low voltage (Light Level Request Low which is, for example, 0V when using 0-10V DC control) to a high voltage (Light Level Request High which is, for example, 10 Volts when using 0-10V DC control). In response, though delayed in time, the sensed light intensity changes from a minimum sensed light intensity to a maximum sensed light intensity, and further includes an average sensed light intensity. It is to be understood the alternate light dimming techniques can alternatively or additionally be used.

For an embodiment, the light and light fixture are determined to be properly operating if some conditions are met. For one embodiment using the 0-10V DC dimming control, the conditions include 1) the difference between Light Level Request Low and Light Level Request High being greater than a threshold voltage. For a specific embodiment, the threshold voltage is 5 volts. 2) The average sensed light intensity is less than a threshold. This is to address a condition in which the ambient light sensor is "washed out" because of an external light source, such as, the sun. If washed out, the monitoring is not conclusive. 3) The previously listed two conditions are met over a reporting period. For a specific embodiment, the reporting period of time is 5 minutes.

Figure 10:
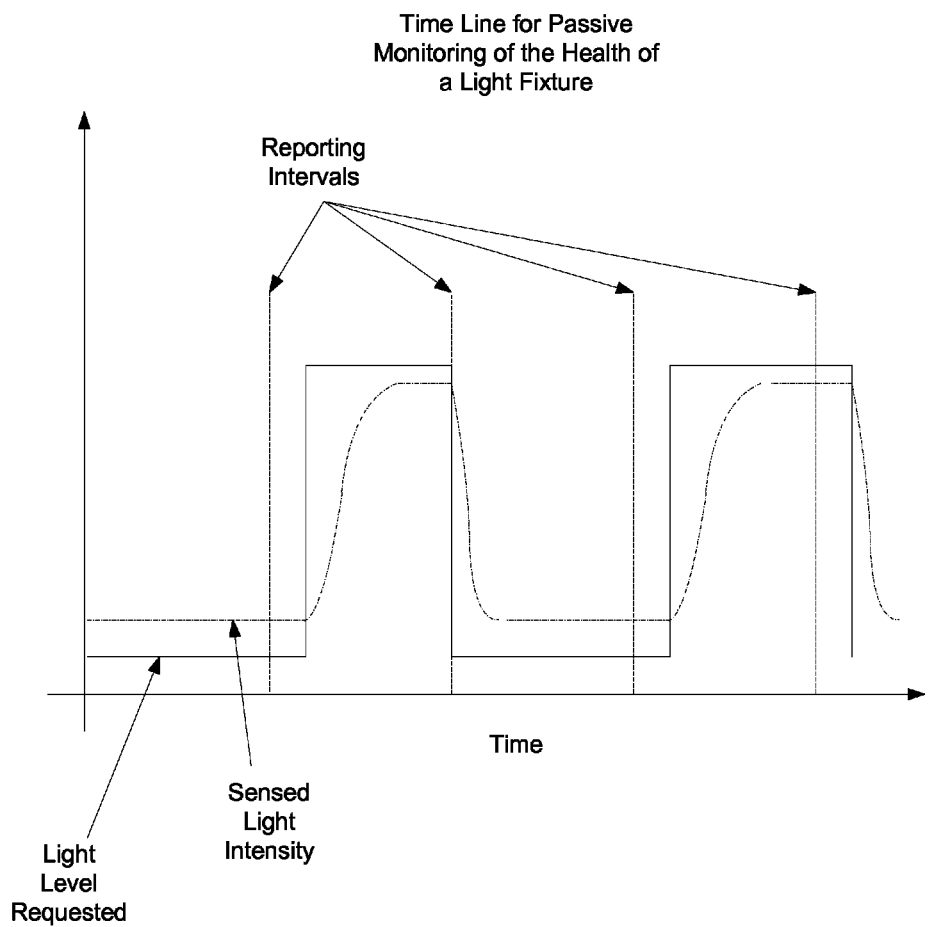
FIG. 10 is a plot that depicts timing of operations of a system that passively monitors operational health of a light fixture, according to an embodiment.

FIG. 10 is a plot that depicts timing of operations of a system that passively monitors operational health of a light fixture, according to an embodiment. As shown, the applied voltage (Light Level Requested) changes over time during normal operation of the light fixture. Additionally, the sensed light intensity (Sensed Light Intensity) is monitored over the same time. During reporting intervals, the applied voltage and the sensed light intensity are monitored to allow a comparison between the applied voltage and the sensed light intensity. The comparisons are used to determine whether the light fixture is properly operating or is faulty.

For one embodiment, the monitoring occurs over reporting intervals, and is then reported periodically, such as, every five minutes. That is, the light fixtures monitor and collect applied control voltage versus sensed light intensity for the duration of the reporting period, and then periodically report the monitored information. If, for example, the reporting period falls during (or just after) the transition of a light, the sensed intensity of light may appear erroneous because the light may not have responded yet to the applied voltage. Therefore, reports that occur within a margin of time of a change in the applied voltage to the light of the light fixture can be ignored.

For another embodiment, the monitoring occurs during reporting intervals. For an embodiment, the reporting intervals are periodic over time, and last for a reporting window duration of time.

The results of the comparisons between the applied control voltage and the resulting sensed emitted light intensity can be problematic if a change of the applied voltage during passive monitoring occurs at an edge of the reporting window. That is, the applied voltage rapidly changes at the edge of a reporting widow, and the emitted light of the light fixture takes a finite amount of time to respond, but the response occurs at the opposite side of the edge of the widow as the change in the applied voltage. This scenario can be combatted by verifying the inconsistent results with a subsequent reporting period, confirming the operation by polling neighboring light fixtures (that is, neighboring light fixtures tend to be exposed to similar operation during passive monitoring), or confirming the operation by performing an active monitoring which include proactively controlling the applied voltage and monitoring the resulting emitted light intensity.

Although specific embodiments have been described and illustrated, the described embodiments are not to be limited to the specific forms or arrangements of parts so described and illustrated. The embodiments are limited only by the appended claims.

What is claimed:

1. A lighting fixture, comprising:
    a light;
    a light intensity controller connected to the light for controlling an intensity of light emitted from the light;
    an ambient light sensor for sensing the intensity of light emitted from the light;
    a controller, wherein at least one of the controller or an external controller is operative to estimate a power usage of the lighting fixture based on the sensed intensity of light;
    wherein the lighting fixture and a plurality of other light fixtures report their monitored behavior to a managing controller; and
    wherein the managing controller turns off or on at least some of the other light fixtures that are determined to be neighbors of the light fixture, actively adjusts a dimming control applied to the light, and monitors the intensity of light emitted from the light that results, thereby allowing the managing controller to determine whether the lighting fixture is operating properly.

2. The lighting fixture of claim 1, wherein at least one of the controller or the external controller is operative to monitor operational health of the lighting fixture, comprising adjusting a dimming control applied to the light by greater than a threshold, and monitoring the sensed intensity of light emitted from the light.

3. The lighting fixture of claim 1, further comprising the managing controller actively testing the lighting fixture to determine proper operation of the lighting fixture.

4. The lighting fixture of claim 1, wherein at least one of the controller or the external controller is further operative to monitor operational health of the lighting fixture, comprising passively monitoring a dimming control applied to the light and monitoring a sensed intensity of light emitted from the light.

5. The lighting fixture of claim 1, wherein the power usage of the light is estimated by referencing a known relationship between the power usage and the intensity of light of the light of the lighting fixture, and the sensed emitted light.

6. The lighting fixture of claim 1, wherein at least one of the controller or the external controller is further operative to confirm the estimated power usage by referencing a known relationship between the power usage and a dimming control applied to a light of the lighting fixture.

7. The lighting fixture of claim 6, wherein the confirming power usage is determined based on the known relationship between the power usage and the dimming control applied to the light of the lighting fixture, and an actual dimming control applied to the light.

8. The lighting fixture of claim 1, wherein at least one of the controller or the external controller is further operative to predict an end of life of a light of the lighting fixture by referencing a known relationship of emitted light intensity of the light over time.

9. A lighting fixture, comprising:
    a light;
    a light intensity controller connected to the light for controlling an intensity of light emitted from the light;
    an ambient light sensor for sensing the intensity of light emitted from the light;
    a controller, wherein at least one of the controller or an external controller is operative to estimate a power usage of the lighting fixture based on the sensed intensity of light;
    wherein at least one of the controller or the external controller is further operative to monitor operational health of the lighting fixture, comprising passively monitoring a dimming control applied to the light and monitoring a sensed intensity of light emitted from the light;
    wherein at least one of the controller or the external controller is further operative to poll neighboring light fixtures to aid in determination of a condition of the light fixture if the light fixture fails a passive monitoring test.

10. A lighting fixture, comprising:
a light;
a light intensity controller connected to the light for controlling an intensity of light emitted from the light;
an ambient light sensor for sensing the intensity of light emitted from the light;
a controller, wherein at least one of the controller or an external controller is operative to estimate a power usage of the lighting fixture based on the sensed intensity of light;
wherein at least one of the controller or the external controller is further operative to monitor operational health of the lighting fixture, comprising passively monitoring a dimming control applied to the light and monitoring a sensed intensity of light emitted from the light;
wherein at least one of the controller or the external controller is further operative to initiate an active monitoring test if the light fixture fails a passive monitoring test.

11. A lighting fixture, comprising:
a light;
a light intensity controller connected to the light for controlling an intensity of light emitted from the light;
an ambient light sensor for sensing the intensity of light emitted from the light;
a controller, wherein at least one of the controller or an external controller is operative to estimate a power usage of the lighting fixture based on the sensed intensity of light;
wherein at least one of the controller or the external controller is further operative to generate a reference lighting intensity change by at least one of turning the light of the lighting fixture off or on, and then the ambient light sensor sensing a light level change when the light is at least one of turned off or on.

12. A lighting fixture, comprising:
a light;
a light intensity controller connected to the light for controlling an intensity of light emitted from the light;
an ambient light sensor for sensing the intensity of light emitted from the light;
a controller, wherein at least one of the controller or an external controller is operative to estimate a power usage of the lighting fixture based on the sensed intensity of light;
wherein at least one of the controller or the external controller is further operative to determine a baseline representation of an on and off state of the light and resulting sensed intensity of light at installation, and compare the baseline representation with later obtained representations of on and off states of the light and resulting sensed intensity of light.

13. The lighting fixture of claim 12, wherein if a gradual degradation of sensed intensity of light is observed, at least one of the controller or the external controller deducing that the light is aging, and if a sudden degradation of sense light intensity of the light is observed, then at least one of the controller or the external controller deducing that at least one sub-light of a plurality of sub-lights of the light is non-operational.

14. The lighting fixture of claim 12, wherein at least one of the controller or the external controller is further operative to predict an end of life of a light of the lighting fixture by detecting a significant drop in light intensity with reference to the baseline emitted light intensity.

15. A lighting fixture, comprising:
a light;
a light intensity controller connected to the light for controlling an intensity of light emitted from the light;
an ambient light sensor for sensing the intensity of light emitted from the light;
a controller, wherein at least one of the controller or an external controller is operative to estimate a power usage of the lighting fixture based on the sensed intensity of light;
wherein at least one of the controller or the external controller is further operative to determine a baseline representation of dimming control voltage applied to the light and resulting sensed intensity of light at installation, and compare the baseline representation with later obtained representations of dimming control voltage applied to the light and resulting sensed intensity of light.

16. The lighting fixture of claim 15, wherein if a gradual degradation of sensed intensity of light is observed, at least one of the controller or the external controller deducing that the light is aging, and if a sudden degradation of sense light intensity of the light is observed, then at least one of the controller or the external controller deducing that at least one sub-light of a plurality of sub-lights of the light is non-operational.

17. The lighting fixture of claim 15, wherein at least one of the controller or the external controller is further operative to predict an end of life of a light of the lighting fixture by detecting a significant drop in light intensity with reference to the baseline emitted light intensity.

18. A method of a lighting fixture determining its power usage, comprising:
sensing, by an ambient light sensor, an intensity of light emitted from the lighting fixture;
estimating power usage of the lighting fixture based on the sensed intensity of light
wherein the lighting fixture and a plurality of other light fixtures report their monitored behavior to a managing controller; and
wherein the managing controller turns off or on at least some of the other light fixtures that are determined to be neighbors of the light fixture, actively adjusts a dimming control applied to the light, and monitors the intensity of light emitted from the light that results, thereby allowing the managing controller to determine whether the lighting fixture is operating properly.

19. The lighting method of claim 18, further comprising monitoring operational health of the lighting fixture, comprising adjusting a dimming control applied to the light by greater than a voltage threshold, and monitoring the sensed intensity of light emitted from the light.

20. The method of claim 18, wherein the power usage of the light fixture is estimated by referencing a known relationship between the power usage and the emitted light of a light of the lighting fixture, and the sensed emitted light.

21. The method of claim 18, further comprising generating a reference lighting intensity by at least one of turning the light of the lighting fixture off or on, and then the ambient light sensor sensing a light level when the light is at least one of turned off or on.

* * * * *